(12) United States Patent
Xiaowu et al.

(10) Patent No.: US 8,149,601 B2
(45) Date of Patent: Apr. 3, 2012

(54) ADAPTIVE SLOPE COMPENSATION METHOD FOR STABILIZING A CONTINUOUS CONDUCTION MODE CONVERTER

(75) Inventors: Gong Xiaowu, Singapore (SG); Kok Siu Kam, Singapore (SG); Thian Yaw Hann, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 891 days.

(21) Appl. No.: 12/170,641

(22) Filed: Jul. 10, 2008

(65) Prior Publication Data

US 2010/0008108 A1    Jan. 14, 2010

(51) Int. Cl.
*H02M 3/335* (2006.01)

(52) U.S. Cl. .................................. 363/21.12; 363/21.15

(58) Field of Classification Search ..... 363/21.12–21.18
See application file for complete search history.

(56) References Cited

U.S. PATENT DOCUMENTS

| 4,837,495 | A | * | 6/1989 | Zansky | ....................... 363/21.04 |
| 5,914,865 | A | * | 6/1999 | Barbehenn et al. | ......... 363/21.15 |

* cited by examiner

*Primary Examiner* — Jue Zhang
(74) *Attorney, Agent, or Firm* — Slater & Matsil, L.L.P.

(57) ABSTRACT

An embodiment of the invention relates to a power converter operable in a continuous conduction mode and a discontinuous conduction mode that includes a current-sense circuit element configured to produce a current-sense signal dependent on a current in an inductor of the power converter, and a difference circuit configured to produce a difference signal representing a difference of the current-sense signal and a signal representing an output characteristic of the power converter such as an output voltage. The difference signal is constrained to be above a difference signal threshold value. A slope compensation circuit is configured to produce a slope-compensated signal that includes a sum of the difference signal and the current-sense signal. A controller is configured to control a duty cycle of a power switch of the power converter in response to the slope-compensated signal by comparing the slope-compensated signal with a voltage threshold controlled by a feedback circuit.

22 Claims, 8 Drawing Sheets

ADAPTIVE SLOPE COMPENSATION METHOD FOR STABILIZING A CONTINUOUS CONDUCTION MODE CONVERTER

TECHNICAL FIELD

An embodiment of the invention relates generally to electronic power conversion and methods, and more particularly to providing slope compensation for a sensed current in a switch-mode power converter.

BACKGROUND

A switch-mode power converter (also referred to as a "power converter" or "regulator") is a power supply or power processing circuit that converts an input voltage waveform into a specified output voltage waveform. DC-DC power converters convert a dc input voltage into a dc output voltage. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the switches of the power converter. The duty cycle is a ratio represented by a conduction period of a switch to a switching period thereof. Thus, if a switch conducts for half of the switching period, the duty cycle for the switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle of the switches therein to maintain an output characteristic such as an output voltage at a desired value.

In an exemplary application, the power converters have the capability to convert an unregulated input voltage, such as 12 volts, supplied by an input voltage source to a lower, regulated, output voltage, such as 2.5 volts, to power a load. To provide the voltage conversion and regulation functions, the power converters include active power switches such as metal-oxide semiconductor field-effect transistors ("MOSFETs") that are coupled to the voltage source and periodically switch a reactive circuit element such as an inductor or the primary winding of a transformer to the voltage source at a switching frequency that may be on the order of 500 kHz or higher.

A conventional way to regulate an output characteristic of a switch-mode power converter, such as output voltage, is to sense a current in an inductive circuit element such as an output inductor in a forward converter topology or a transformer primary winding in a forward or flyback converter topology, and compare the sensed current with a threshold current level to control a duty cycle of the power converter. The threshold current level is generally set by an error amplifier coupled to a circuit node such as an output terminal of the power converter to regulate the output characteristic. The mechanism to control duty cycle is a signal to turn a power switch "on" or "off."

A feedback circuit structure wherein a duty cycle of the power converter is controlled by sensing a current in an inductive circuit element and comparing the sensed current to a threshold that is controlled by an error amplifier is generally referred to as current-mode control. An alternative feedback circuit structure wherein a duty cycle of the power converter is controlled by comparing a triangular waveform generated by an oscillator to a threshold voltage level controlled by an error amplifier is generally referred to as voltage-mode control.

In current-mode control, two feedback loops can usually be identified. In one loop, referred to as the inner current feedback loop, the sensed current is compared with a threshold current level. A second loop, referred to as the outer voltage feedback loop, provides the threshold current level with an error amplifier that senses an output characteristic of the power converter, such as an output voltage. The inner current feedback loop generally becomes unstable in a continuous current mode ("CCM") of operation when duty cycle increases beyond 50%, regardless of the stability of the outer voltage feedback loop. CCM refers to uninterrupted current flow in an inductor such as an output inductor over a switching period of the power converter. The inner current feedback loop does not become unstable in a discontinuous current mode ("DCM") of operation. Many power converter designs would suffer serious limitations if duty cycle greater than 50% was not allowed.

The stability of the inner current feedback loop is dependent on loading and the slope of the sensed current versus time. By injecting a small amount of slope compensation into the inner current feedback loop, stability of this loop results for all values of duty cycle. A process to adjust the slope of the sensed current is generally referred to as slope compensation. In one method to provide slope compensation, as described in U.S. Pat. No. 4,672,518, a fixed-slope ramp signal is generated by an oscillator and is summed with a sensed current waveform to produce a slope-compensated current signal. However, under high-current loading of the power converter, the slope compensation signal is disabled, which does not ensure system stability in a continuous conduction mode of operation at high output current levels. While this technique recognizes that a compensating ramp signal may be optimized for one mode of operation, fixed slope compensation is generally suitable only for certain but not all applications.

In another method to provide slope compensation, as described in U.S. Pat. No. 4,837,495, a variable slope ramp signal is generated dependent on the input voltage and the output voltage that is summed with a sensed current waveform for slope compensation. The effect of slope compensation also depends on the value of the circuit inductor value, which is not compensated by this method. Inaccurate slope compensation can produce an overcompensated or undercompensated transient response of the power converter, which is frequently a specified power converter characteristic. In addition, an extra physical pin must generally be provided for the input voltage sensing function.

In a third method to provide slope compensation, as described in U.S. Pat. No. 5,903,452, a fixed slope compensation method is described. In this method, slope compensation is again dependent on a value of inductance and on the input voltage, the effects of which are not compensated by the method, producing thereby inaccurate compensation under certain operating conditions.

Thus, there is a need for a process and related method to provide slope compensation for a sensed current in a switch-mode power converter that avoids the disadvantages of conventional approaches.

SUMMARY OF THE INVENTION

In accordance with an exemplary embodiment, a power converter and a related method are provided. In an embodiment, the power converter includes a current-sense circuit element configured to produce a current-sense signal dependent on a current in an inductor of the power converter, and a difference circuit configured to produce a difference signal representing a difference of the current-sense signal and a signal representing an output characteristic of the power converter. In an embodiment, the difference signal is constrained to be above a difference signal threshold value. In an embodiment, a slope compensation circuit is configured to produce a slope-compensated signal comprising a sum of the difference signal and the current-sense signal.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a switch-mode power converter including a feedback process operative with a current sensing means for a current in an inductive circuit element. The feedback process includes a slope compensation circuit configured to modify the slope of the sensed current.

An embodiment of the invention may be applied to various electronic power conversion devices, for example, to a power converter to produce a regulated output voltage from an unregulated input voltage. Other electronic power conversion devices can be constructed using a slope-compensation process as introduced herein in different contexts using inventive concepts described herein, for example, a power amplifier or a motor controller applied in a communications or an industrial environment.

Figure 1:
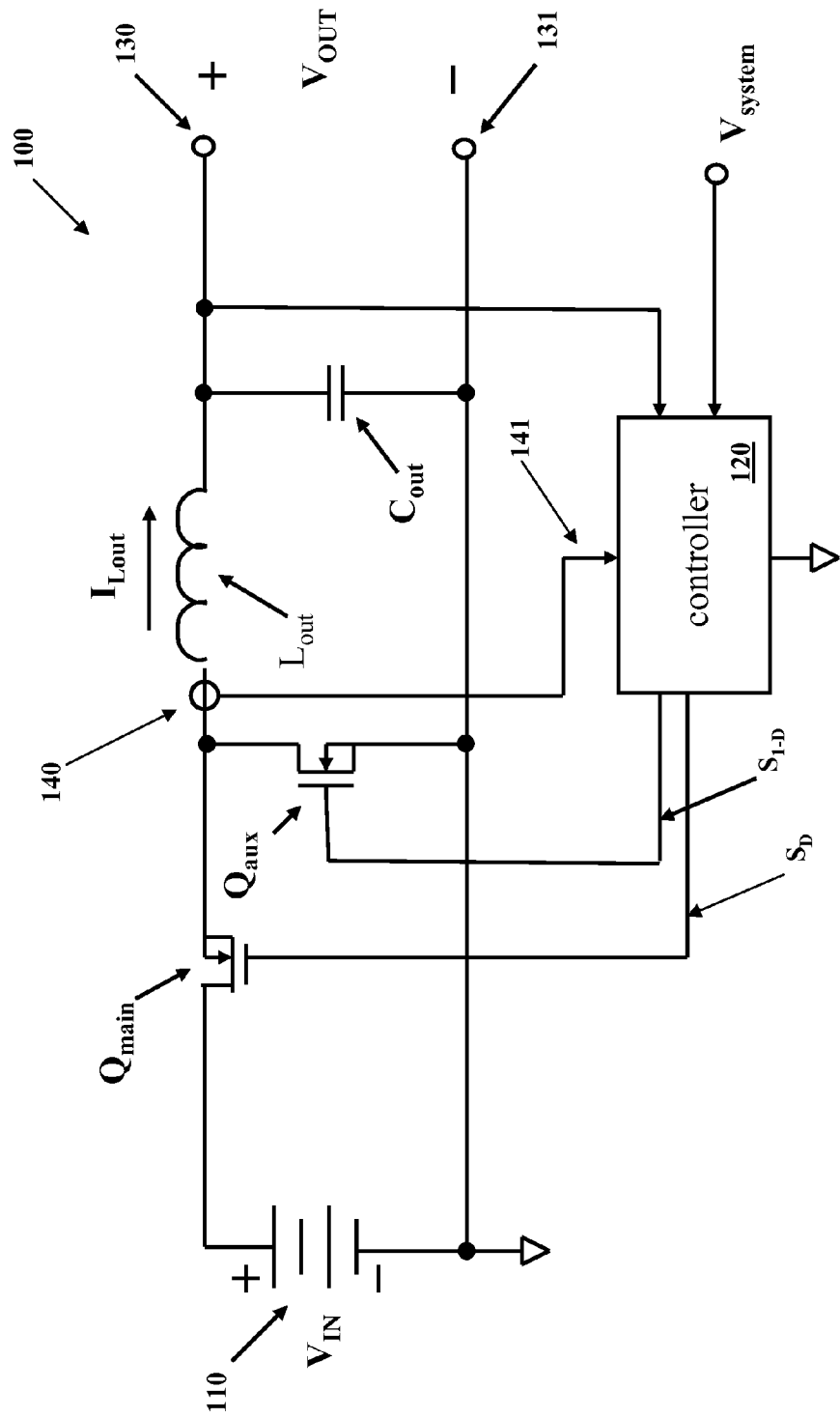
FIGS. 1 and 2 illustrate schematic drawings of a power train of a power converter, constructed according to exemplary embodiments.

Referring initially to FIG. 1, illustrated is a simplified schematic diagram of an embodiment of a power train 100 of a switch-mode power converter to illustrate the operation thereof. The power converter includes a controller 120 that regulates a power converter output characteristic such as an output voltage. The power converter provides power to a system/load (not shown) coupled to output terminals 130 and 131. While in the illustrated embodiment the power train employs a buck converter topology, those skilled in the art should understand that other converter topologies such as a flyback topology or an isolated forward topology are well within the broad scope of the present invention.

The power train of the power converter receives an input voltage $V_{IN}$ from a source of electrical power (represented by battery 110) at an input thereof and provides a regulated output voltage $V_{OUT}$ or other output characteristic at output terminals 130 and 131. In keeping with the principles of a buck converter topology, the output voltage $V_{OUT}$ is generally less than the input voltage $V_{IN}$ such that a switching operation of the power converter can regulate the output voltage $V_{OUT}$.

During a first portion D of a high-frequency switching cycle, the power switch $Q_{main}$ is enabled to conduct in response to a gate drive signal SD for a primary interval, coupling the input voltage $V_{IN}$ to an output filter inductor $L_{out}$. During the first portion D of the switching cycle, an inductor current $I_{Lout}$ flowing through the output filter inductor $L_{out}$ increases as current flows from the input to the output of the power train. An ac component of the inductor current $I_{Lout}$ is filtered by the output capacitor $C_{out}$.

During a second portion 1-D of the switching cycle, the power switch $Q_{main}$ is transitioned to a non-conducting state, and an auxiliary power switch $Q_{aux}$ (e.g., an n-channel MOSFET), coupled to the output filter inductor $L_{out}$, is enabled to conduct in response to a gate drive signal $S_{1-D}$. The auxiliary power switch $Q_{aux}$ provides a path to maintain continuity of inductor current $I_{Lout}$ flowing through the output filter inductor $L_{out}$. During the second portion 1-D of the switching cycle, the inductor current $I_{Lout}$ flowing through the output filter inductor $L_{out}$ decreases. In general, the duty cycle of the power switch $Q_{main}$ and the auxiliary power switch $Q_{aux}$ may be adjusted to regulate the output voltage $V_{out}$ of the power converter. Those skilled in the art should understand, however, that the conduction periods for the two power switches may be separated by a small time interval to avoid cross conduction therebetween, and beneficially to reduce the switching losses associated with the power converter.

The controller 120 of the power converter receives the output voltage $V_{OUT}$ of the power converter and a desired output characteristic such as a desired system voltage $V_{system}$. In addition, the controller 120 receives a signal 141 from a current sensing device 140 that senses a current in the inductor $L_{out}$. The current sensing device 140 can be constructed with a current sensing transformer or a sense resistor and an operational amplifier using techniques well known in the art. The controller 120 controls conductivity of the power switch $Q_{main}$ with a duty cycle D.

In a switch-mode power converter, such as the buck power converter illustrated and described with reference to FIG. 1, the duty cycle D of the power switch $Q_{main}$ determines the steady-state ratio of a power converter output voltage $V_{OUT}$ to its input voltage $V_{in}$. In particular, for a buck power converter topology operating in a continuous conduction mode, the duty cycle determines the ratio of output voltage to input voltage (ignoring certain losses within the power converter) according to the equation:

$$D = V_{OUT}/V_{IN}.$$

In an alternative power converter topology, such as a boost topology, the duty cycle may determine the ratio of output voltage to input voltage according to another equation.

Figure 2:
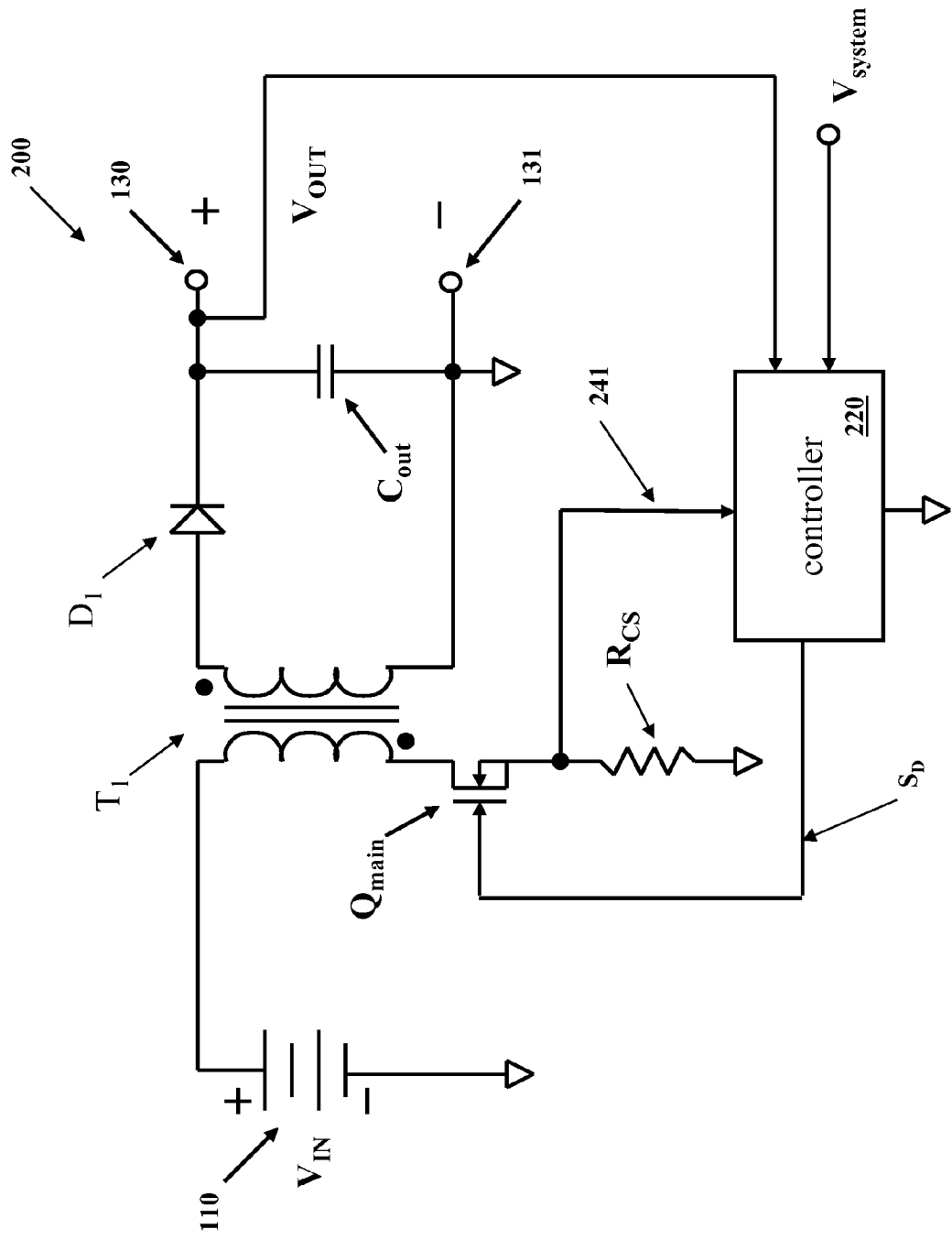

Turning now to FIG. 2, illustrated is a simplified schematic diagram of an embodiment of a flyback power train 200 of a switch-mode power converter to illustrate the operation thereof. The power train includes transformer $T_1$ coupled to the input voltage source 110 and to the power switch $Q_{main}$. Current sense resistor $R_{CS}$ is coupled in series with the power switch $Q_{main}$ to sense a current therethrough to produce a current sense signal 241. The secondary winding of the transformer $T_1$ is coupled to diode $D_1$, which in turn is coupled to output filter capacitor $C_{out}$. The windings of the transformer $T_1$ are poled as indicated by the dots in the figure. Output voltage $V_{OUT}$ is produced at output terminals 130 and 131 with the indicated polarity in the figure. Controller 220 of the power converter receives the output voltage $V_{OUT}$ of the power converter and a desired output characteristic such as a desired system voltage $V_{system}$. The controller 220 receives the signal 241 from a current sense resistor $R_{CS}$ that senses the current in the power switch $Q_{main}$. The controller 220 controls conductivity of the power switch $Q_{main}$ with a duty cycle D.

A new adaptive slope compensation method is introduced wherein the amount of the slope compensation depends on the load level, i.e., whether the load draws a light or a heavy load current, and on the input voltage and/or the value of a circuit inductance associated with switch-mode operation of the power converter.

Figure 3:
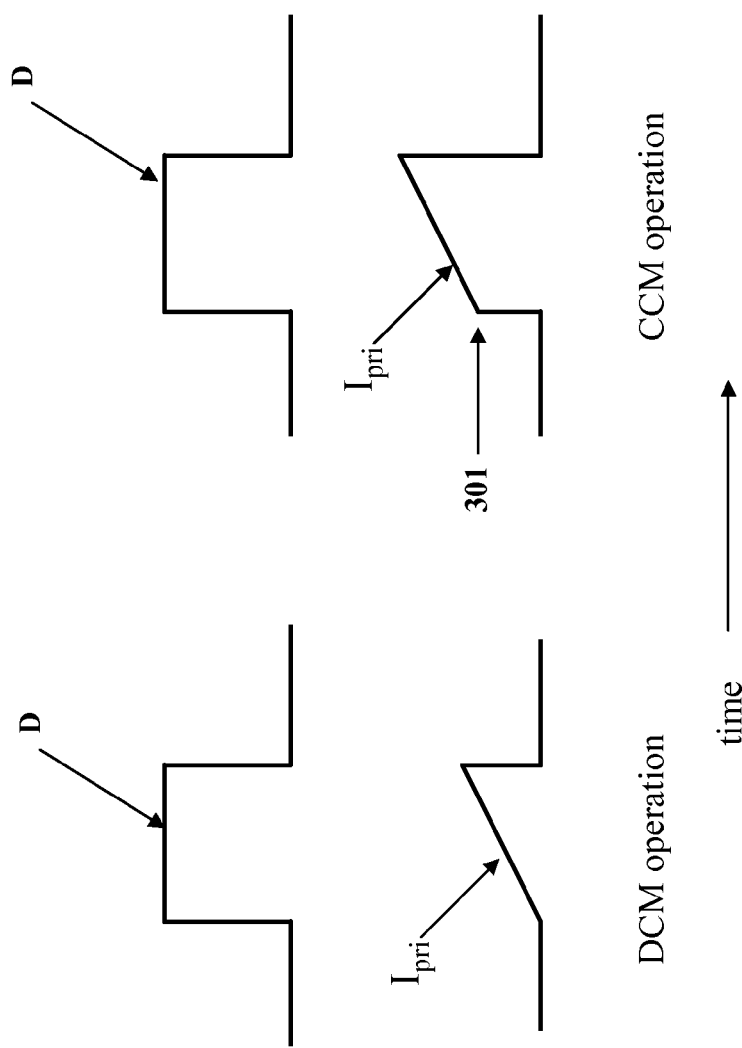
FIG. 3 illustrates typical shapes of an inductor current waveforms in DCM and CCM operation.

The shape of the current waveform in a power switch or an inductive circuit element is generally indicative of DCM or CCM operation. For example, as illustrated in the left portion of FIG. 3, a DCM current waveform $I_{pri}$ is illustrated during a duty cycle D wherein the current ramps up from an initial value of zero at the beginning of the duty cycle. As illustrated in the right portion of FIG. 3, a CCM current waveform $I_{pri}$ is illustrated wherein the current ramps up from an initial positive value 301 at the beginning of the duty cycle.

Figure 4:
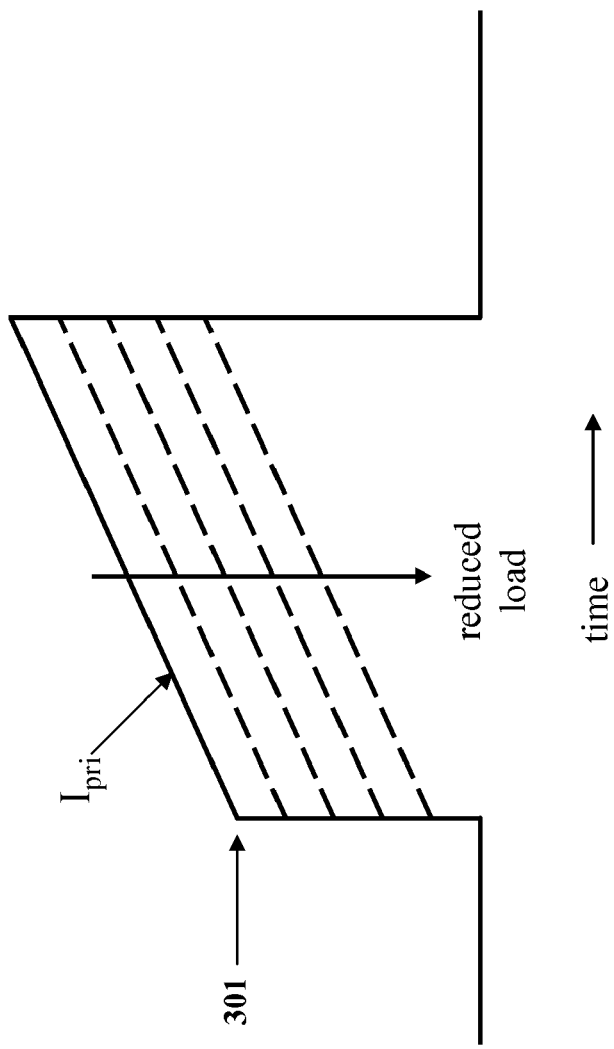
FIGS. 4 and 5 illustrate typical trapezoidal waveforms of current vs. time in a transformer primary winding of a switch-mode power converter operating in a continuous conduction mode.

Turning now to FIG. 4, illustrated is a typical trapezoidal waveform of current $I_{pri}$ vs. time in a transformer primary winding, such as the primary winding of transformer $T_1$ illustrated and described with reference to FIG. 2, of a switch-mode power converter operating in CCM.

As indicated above, the initial nonzero value 301 of the transformer primary current is generally indicative of CCM operation. As the load current is reduced, the area of the trapezoidal current waveform is correspondingly reduced, and the power converter operation moves toward the boundary of DCM operation as the initial value of the transformer primary current approaches zero. More slope compensation is required at heavy load currents, and less at light load currents. Since the load level is reflected in the voltage level of the feedback voltage, the amount of slope compensation can be adjusted accordingly to provide stability during CCM operation.

Figure 5:
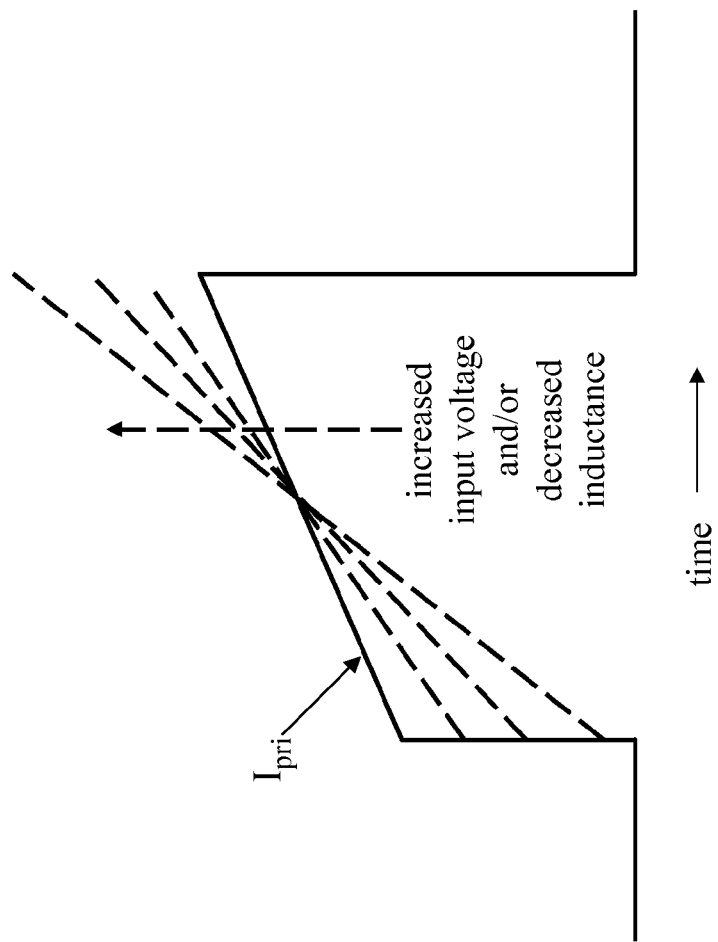

Turning now to FIG. 5, illustrated again is a typical trapezoidal waveform of transformer primary current $I_{pri}$ vs. time in a switch-mode power converter. The figure illustrates the increase in slope of the waveform of current in the transformer primary winding as the input voltage is increased and/or the transformer primary winding (magnetizing) inductance is reduced. By increasing the input voltage and/or reducing the value of inductance, the slope of the primary inductor current increases, as illustrated in FIG. 5. It can be seen from the figure that the system operates in DCM when the slope of the primary inductor current exceeds a certain level, i.e., the initial value of this sloped portion of the current waveform is zero. Therefore, with high input voltage and/or low primary inductance, slope compensation advantageously is disabled.

Figure 6:
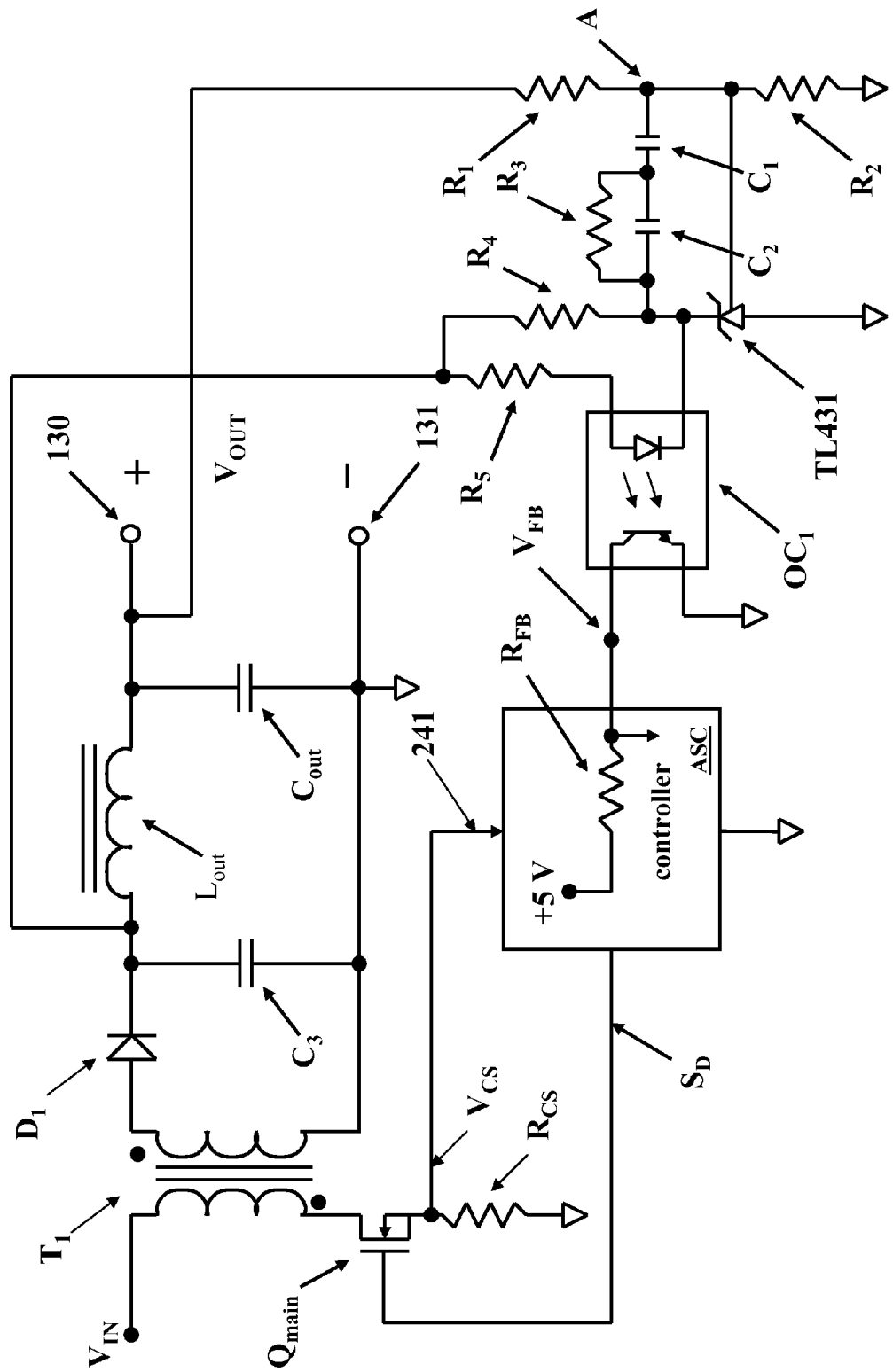
FIG. 6 illustrates a schematic drawing of a power converter including an error amplifier to produce a voltage at a feedback node, constructed according to an embodiment.

Turning now to FIG. 6, illustrated is a schematic drawing of an embodiment of a flyback power converter constructed with a controller including a slope compensation circuit. As illustrated in FIG. 6, resistors $R_1$ and $R_2$ coupled together at circuit node A form a voltage divider that senses the output voltage $V_{OUT}$. The noninverting input of operational amplifier TL431 is internally connected to a 2.5 V reference voltage (not shown), and its external inverting input is connected to voltage divider circuit node A. Operational amplifier TL431 is described in Texas Instruments' datasheet entitled "TL431 Adjustable Precision Shunt Regulator," dated December, 2005, which is hereby referenced and incorporated herein. Resistors $R_3$ and $R_4$ and capacitors $C_1$ and $C_2$ provide feedback gain and feedback loop stability. Resistance and capacitance values for these components are application dependent and can be selected using design techniques well known in the art.

Opto-coupler $OC_1$ operates as a current mirror, mirroring a sensed current on the secondary side of the power converter that flows through resistor $R_5$ to a current on the primary side of the power converter that flows through resistor $R_{FB}$ without a metallic connection. Resistor $R_{FB}$ in controller ASC is coupled to a reference voltage source, preferably to an internal +5 V reference voltage source as illustrated in FIG. 6.

A current-sense signal $V_{CS}$ produced by current flowing through sense resistor $R_{CS}$ provides an indication of current flowing through main power switch $Q_{main}$.

The resistor $R_{FB}$ coupled to the reference voltage source is coupled to an output terminal of opto-coupler $OC_1$ to produce a feedback voltage at the node $V_{FB}$ controlled by the output current from opto-coupler $OC_1$. When power converter output voltage is high, voltage divider circuit node A is correspondingly high. The output voltage of operational amplifier TL431 will be low and current flowing through resistor $R_5$ and the opto-coupler input diode will be high. The high opto-coupler input current is thus coupled to controller ASC. Current flowing through the resistor $R_{FB}$ causes the voltage at node $V_{FB}$ to be low. Alternatively, when the power converter output voltage is low, voltage divider circuit node A is low, the output of operational amplifier TL431 voltage is high, and current flowing through resistor $R_5$ and the opto-coupler input diode is low. The low opto-coupler input current is coupled to controller ASC, and due to the resistor $R_{FB}$, the voltage at node $V_{FB}$ will be high.

The flyback circuit illustrated in FIG. 6 includes a capacitor-inductor-capacitor output filter ($C_3$, $L_{out}$, $C_{out}$) to provide a further level of output filtering than that illustrated in FIG. 2 with the single output filter capacitor $C_{out}$.

Figure 7:
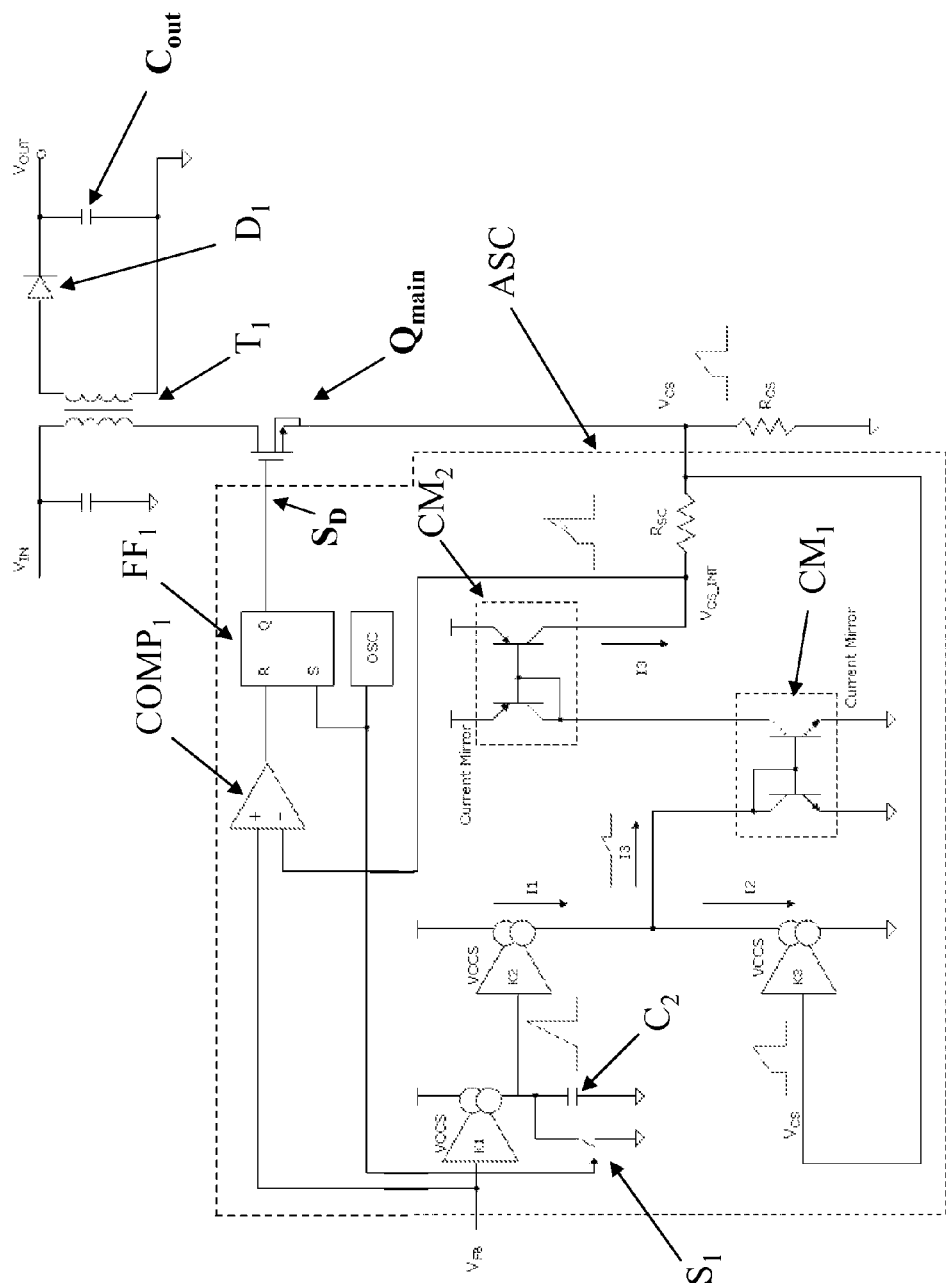
FIG. 7 illustrates a simplified schematic drawing of an adaptive slope compensation circuit, constructed according to an embodiment.

Turning now to FIG. 7, illustrated is a simplified schematic drawing of an embodiment of an adaptive slope compensation circuit provided by controller ASC. In the example illustrated in FIG. 7, the adaptive slope compensation circuit is coupled to a power converter formed with a flyback circuit topology. The power train of the flyback power converter includes the transformer $T_1$, power switch $Q_{main}$, diode $D_1$, and output capacitor $C_{out}$. The flyback power converter is operative as described with reference to the circuit illustrated in FIG. 2. The adaptive slope compensation circuit includes three voltage-controlled current sources (VCCSs), two current mirrors, a switch, a capacitor and a resistor.

The output voltage $V_{OUT}$ is sensed with a resistor-divider, operational amplifier, opto-coupler circuit (not shown in FIG. 7) as illustrated and described with reference to FIG. 6 to produce a feedback voltage at the node $V_{FB}$. The feedback voltage at the node $V_{FB}$ is one of the input signals to the adaptive slope compensation circuit.

The feedback voltage $V_{FB}$ is connected to VCCS K1 to generate a current dependent on the level of the feedback voltage, i.e., the voltage level produced by the error amplifier. This current charges capacitor $C_2$, which is discharged by the oscillator OSC through switch $S_1$ during the gate "off" duration of power switch $Q_{main}$. A sawtooth waveform is generated for slope compensation by switching on and off of the switch $S_1$. This sawtooth voltage is converted into current I1 by VCCS K2. Hence the slope of current I1 is determined by the feedback voltage $V_{FB}$. Higher feedback voltage produces a steeper current slope of I1.

A current-sense voltage $V_{CS}$ is produced across the resistor $R_{CS}$ by the current flowing through the primary winding of transformer $T_1$ and the power switch $Q_{main}$ to provide a second input signal to the adaptive slope compensation circuit. The current-sense voltage Vcs is coupled to VCCS K3 to generate current I2 proportional to Vcs. Current I3 is the current that is the difference between current I1 and current I2. A component of the current I3 is proportional to feedback voltage. The current I3 vanishes if the slope of the voltage Vcs is more than a pre-determined level.

The gain of VCCS K3 is chosen such that when the power converter goes into DCM, i.e., if the slope of Vcs is sufficiently steep as described hereinabove, then no current I3 is produced for slope compensation.

The current I3 is mirrored through the pair of current mirrors $CM_1$ and $CM_2$ and is coupled to the slope compensation resistor Rsc. The voltage across Rsc compensates the voltage Vcs according to the level of current I3 multiplied by the value of resistance Rsc. It is assumed, without limitation, that the value of resistance Rsc is much greater than the value of the resistance Rcs. Thus, the influence of this current on the voltage Vcs can be ignored.

Comparator $COMP_1$ is coupled to the feedback voltage $V_{FB}$ and to the slope compensated voltage $V_{CS\_INT}$ produced at the left terminal of the slope compensation resistor Rsc. The combination of the feedback voltage $V_{FB}$ and the slope compensated voltage $V_{CS\_INT}$ enables comparator $COMP_1$ to produce a signal to establish the duty cycle of the power converter. The output of comparator $COMP_1$ is coupled to the "reset" input of set-reset ("SR") flipflop $FF_1$ to produce a signal to terminate power converter duty cycle. The output of $FF_1$ is coupled to the gate of power switch $Q_{main}$. The "set" input of flipflop $FF_1$ is coupled to oscillator OSC to initiate the power converter duty cycle.

Figure 8:
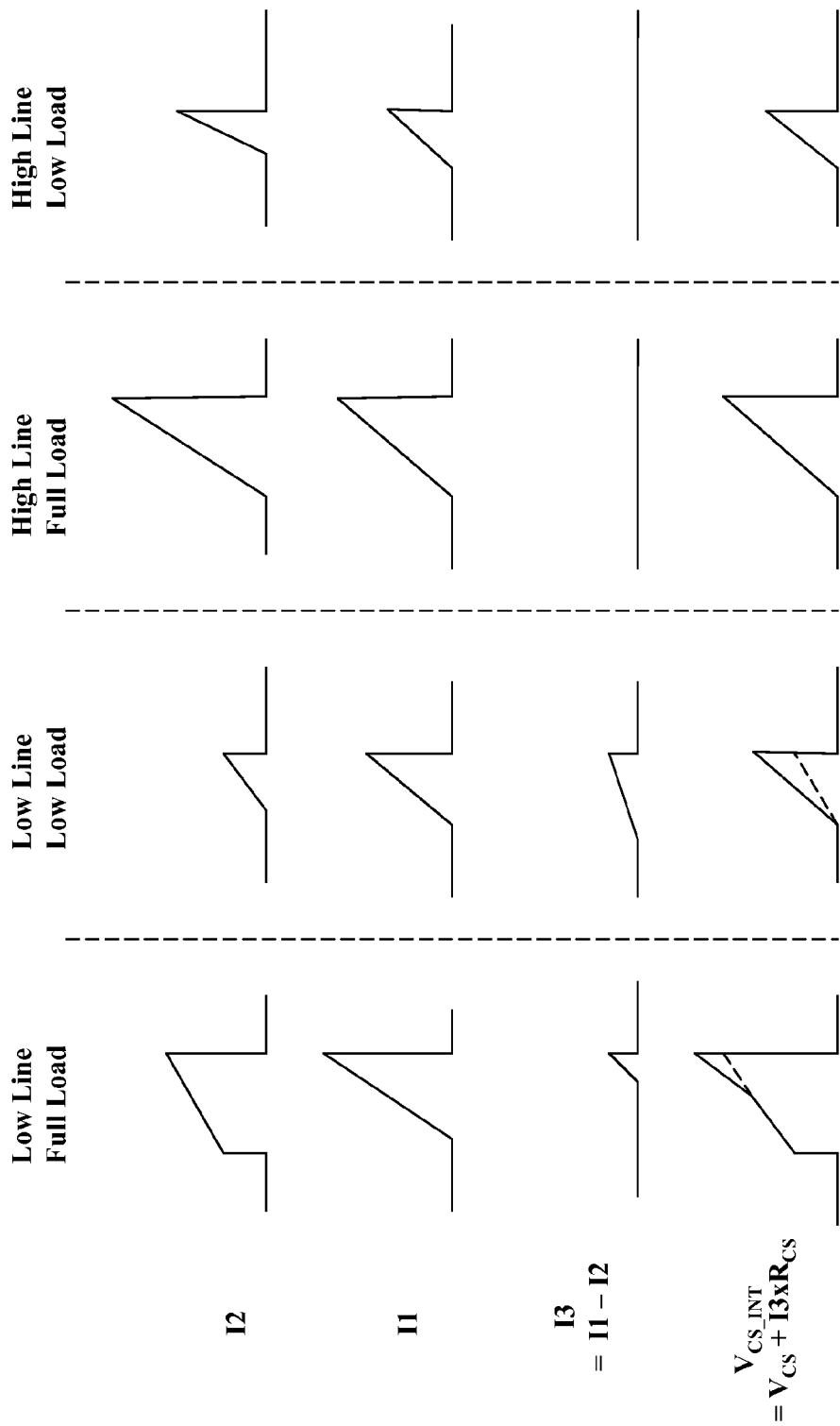
FIG. 8 illustrates relationships among internal currents of an adaptive slope compensation circuit, the level of load current, and the input voltage level for different operating conditions of a power converter, constructed according to an embodiment.

Turning now to FIG. 8, illustrated are relationships among the currents I1, I2, I3, the level of load current, and the input voltage level for different operating conditions of the power converter illustrated and described with reference to FIG. 7. The first and second columns of FIG. 8 illustrate waveforms produced at low input voltages to the power converter. Under these conditions, at sufficient input current, the power converter typically operates in CCM. Accordingly, slope compensation is normally required. The first column illustrates that at a full load condition, the peak value of the current I1 is high, producing a substantial level of slope compensation as indicated by the slope-compensated signal $V_{CS\_INT}$. Less slope compensation is produced at lower levels of load current as indicated in the second column.

The third and forth columns illustrate operation at high input voltage levels. At high input voltage, the power converter typically operates in DCM. Therefore, no slope compensation is normally required. Since the slope of the current I2 is greater than the slope of the current I1, the current I3 becomes zero, producing no added slope compensation at high line voltages. Hence the circuit advantageously produces no slope compensation during DCM operation.

Because the feedback voltage $V_{FB}$ is dependent on the level of load current, the slope of the voltage $V_{CS}$ reflects both the input voltage and the value of the transformer primary winding inductance. Thus, important factors relating to slope compensation are included in the process performed by an adaptive slope compensation circuit has introduced herein. Slope compensation is thereby performed automatically and adaptively. The slope compensation process does not require the addition of an external pin to sense input voltage. Advantageously, the process does not require circuit adjustment during manufacture.

The concept has thus been introduced of using a voltage feedback signal and a current sense signal to produce a slope compensation signal for a power converter without the need for an added pin and without the need for adjustment during a manufacturing process. In an embodiment, the power converter includes a current-sense circuit element configured to produce a current-sense signal dependent on a current in an inductor of the power converter, and a difference circuit configured to produce a difference signal representing a difference of a signal representing an output characteristic of the power converter and the current-sense signal, the difference signal constrained to be above a difference signal threshold value. In an embodiment, the power converter further includes a slope compensation circuit configured to produce a slope-compensated signal comprising a sum of the difference signal and the current-sense signal. In an embodiment, the power converter further includes a controller configured to control a duty cycle of a power switch of the power converter in response to the slope-compensated signal. The controller controls the duty cycle by comparing the slope-compensated signal with a voltage threshold controlled by a feedback circuit. In an embodiment, the feedback circuit includes an error amplifier with an input coupled to the output characteristic. In a further embodiment, the feedback circuit includes an opto-coupler. In an embodiment, the difference signal threshold value is zero volts. In an embodiment, the power converter comprises a flyback circuit topology. In an embodiment, the output characteristic is an output voltage of the power converter.

In a further embodiment, the difference circuit comprises two voltage controlled current sources configured to produce the difference signal and the slope compensation circuit comprises a pair of current mirrors configured to produce the sum of the difference signal and the current-sense signal. In an embodiment, the power converter is operable in a continuous conduction mode and a discontinuous conduction mode. In an embodiment, the difference signal is substantially zero in the discontinuous conduction mode of operation.

Another exemplary embodiment provides a method of controlling a power converter. The method includes producing a signal representing a current in an inductor of the power converter, and producing a difference signal representing a difference of a signal representing an output characteristic of the power converter and the signal representing the current in the inductor of the power converter. The method further includes constraining the difference signal to be above a difference signal threshold value, and producing a slope-compensated signal comprising a sum of the difference signal and the current-sense signal. In an embodiment, the method further includes controlling a duty cycle of a power switch of the power converter in response to the slope-compensated signal. In an embodiment, the method further includes controlling a voltage threshold with a feedback circuit coupled to the output characteristic, wherein the duty cycle is controlled by comparing the slope-compensated signal with the voltage threshold. In an embodiment, the method includes forming the feedback circuit with an error amplifier with an input coupled to the output characteristic. In an embodiment, the method further includes using an opto-coupler to provide metallic isolation in the feedback circuit. In an embodiment, the method further includes using zero volts for the difference signal threshold value. In an embodiment, the method includes using a flyback circuit topology in the power converter. In an embodiment, the method further includes using an output voltage of the power converter for the output characteristic.

In a further embodiment, the method includes forming the difference signal with two voltage controlled current sources. In an embodiment, the method further includes producing the sum of the difference signal and the current-sense signal with a pair of current mirrors. In an embodiment, the method further includes operating the power converter in a continuous conduction mode and a discontinuous conduction mode. In an embodiment of the method, the difference signal is substantially zero in the discontinuous conduction mode of operation.

Although a slope compensation circuit and related methods have been described for application to electronic power conversion, it should be understood that other applications of a slope compensation circuit, such as a slope compensation circuit in a power amplifier, are contemplated within the broad scope of the invention, and need not be limited to electronic power conversion applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power converter, comprising:
   a current-sense circuit element configured to produce a current-sense signal dependent on a current in an inductor of the power converter;
   a difference circuit configured to produce a difference signal representing a difference of a signal representing an output characteristic of the power converter and the current-sense signal, the difference signal constrained to be above a difference signal threshold value; and
   a slope compensation circuit configured to produce a slope-compensated signal comprising a sum of the difference signal and the current-sense signal, wherein the slope compensation circuit comprises a pair of current mirrors configured to produce the sum of the difference signal and the current-sense signal.

2. The power converter as claimed in claim 1, further including a controller configured to control a duty cycle of a power switch of the power converter in response to the slope-compensated signal.

3. The power converter as claimed in claim 2, wherein the controller controls the duty cycle by comparing the slope-compensated signal with a voltage threshold controlled by a feedback circuit.

4. The power converter as claimed in claim 3, wherein the feedback circuit includes an error amplifier with an input coupled to the output characteristic.

5. The power converter as claimed in claim 3, wherein the feedback circuit includes an opto-coupler.

6. The power converter as claimed in claim 1, wherein the difference signal threshold value is zero volts.

7. The power converter as claimed in claim 1, wherein the power converter comprises a flyback circuit topology.

8. The power converter as claimed in claim 1, wherein the output characteristic is an output voltage of the power converter.

9. The power converter as claimed in claim 1, wherein the difference circuit comprises two voltage controlled current sources configured to produce the difference signal.

10. The power converter as claimed in claim 1, wherein the power converter is operable in a continuous conduction mode and a discontinuous conduction mode.

11. The power converter as claimed in claim 10, wherein the difference signal is substantially zero in the discontinuous conduction mode.

12. A method of controlling a power converter, the method comprising:
    producing a current sense signal representing a current in an inductor of the power converter;
    producing a difference signal representing a difference of a signal representing an output characteristic of the power converter and the current sense signal;
    constraining the difference signal to be above a difference signal threshold value;
    producing a sum of the difference signal and the current-sense signal with a pair of current mirrors; and
    producing a slope-compensated signal comprising a sum of the difference signal and the current-sense signal.

13. The method as claimed in claim 12, further comprising controlling a duty cycle of a power switch of the power converter in response to the slope-compensated signal.

14. The method as claimed in claim 13, further comprising controlling a voltage threshold with a feedback circuit coupled to the output characteristic, wherein the duty cycle is controlled by comparing the slope-compensated signal with the voltage threshold.

15. The method as claimed in claim 14, further comprising forming the feedback circuit with an error amplifier with an input coupled to the output characteristic.

16. The method as claimed in claim 14, further comprising using an opto-coupler to provide metallic isolation in the feedback circuit.

17. The method as claimed in claim 12, wherein the difference signal threshold value is zero volts.

18. The method as claimed in claim 12, wherein the power converter comprises a flyback circuit topology.

19. The method as claimed in claim 12, wherein the output characteristic is an output voltage of the power converter.

20. The method as claimed in claim 12, further comprising forming the difference signal with two voltage controlled current sources.

21. The method as claimed in claim 12, wherein the power converter is operable in a continuous conduction mode and a discontinuous conduction mode.

22. The method as claimed in claim 12, wherein the difference signal is substantially zero in the discontinuous conduction mode.

* * * * *